(No Model.)

W. SALISBURY.
RAILWAY RAIL FASTENING.

No. 412,797. Patented Oct. 15, 1889.

Witnesses
John W. Tyler
Jno. K. Corwin

Inventor
Wm Salisbury

UNITED STATES PATENT OFFICE.

WILLIAM SALISBURY, OF CLEVELAND, OHIO.

RAILWAY-RAIL FASTENING.

SPECIFICATION forming part of Letters Patent No. 412,797, dated October 15, 1889.

Application filed July 10, 1889. Serial No. 317,067. (No model.)

*To all whom it may concern:*

Be it known that I, WILLIAM SALISBURY, a citizen of the United States, residing at Cleveland, in the county of Cuyahoga and State of Ohio, have invented a new and useful Railway-Rail Fastening, of which the following is a specification.

In improvements for fastening railway-rails at their joints by fish-plates and bolts, my invention provides immovable bolts for securing the plates to the rails and ties.

My object is attained in the construction of the fastening, as shown in section in the accompanying drawings, in which—

Figure 1:
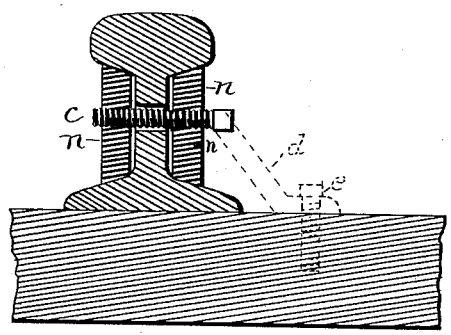
Figure 2:
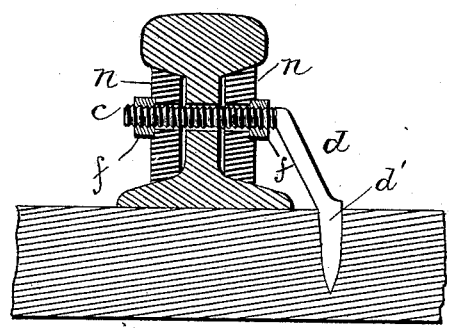

Figure 1 is one form, and Fig. 2 another form, of my invention.

In Fig. 2 the screw-bolt $d$ engages with nuts resting in grooves of the fish-plates, and is provided with a spike-point $d'$ for entering the tie. In their application to the rail the plates $n$ are firmly clamped thereto and the bolt $c$ is turned through both nuts $f$, the outside one of which may be adjusted as required, so as to secure a close contact with the plates. The spike $d'$ is then driven into the tie. The center bolts alone are to be provided with spike-points for the tie. The end bolts are short and engage only the nuts, being swaged or flattened at one end for the purpose of turning, as shown at $c'$, Fig. 1. The pressure exerted by each nut upon the plane of the screw inclines the bolt in opposite directions. It is therefore prevented from turning by that means. The bolt may be turned without releasing the plates until it is entirely withdrawn from one nut, which, from the condition before stated, is not likely to occur.

I claim—

In a railway-rail fastening, the fish-plates held in contact with the rail by a threaded bolt $d$, which engages with nuts placed in a groove outside of said plates, and which is provided with a spike-point to secure the same firmly to the tie, substantially as described.

WILLIAM SALISBURY.

Witnesses:
   JOHN W. TYLER,
   JNO. K. CORWIN.